May 19, 1936.    D. J. MORAN ET AL    2,041,366
FLUID STRAINING DEVICE
Filed April 2, 1934
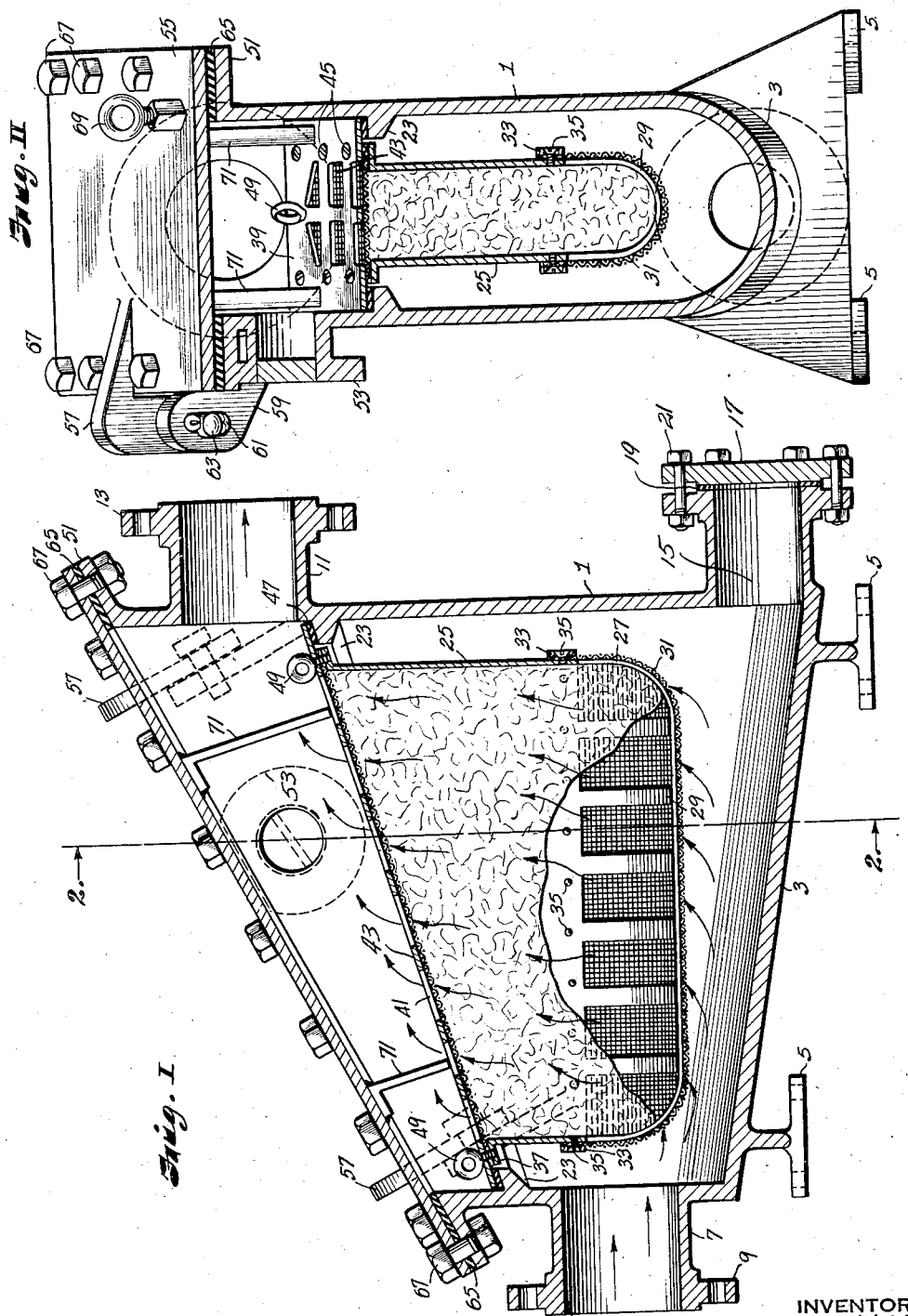
INVENTORS
Daniel J. Moran
and Edwin O. Bennett
BY Thos. E. Scofield
ATTORNEY Patented May 19, 1936

2,041,366

UNITED STATES PATENT OFFICE 2,041,366

FLUID STRAINING DEVICE

Daniel J. Moran and Edwin O. Bennett, Ponca City, Okla., assignors to Continental Oil Company, Ponca City, Okla., a corporation of Delaware Application April 2, 1934, Serial No. 718,587

2 Claims. (Cl. 210—140)

Our invention relates to fluid straining devices and, more particularly, to a straining device suitable for use in pipe lines.

Crude oil which is customarily transported over long distances through pipe lines contains sand and other solid materials and, at the crude source, water varying in amounts from 1% to 2% present as an easily separated suspension to 60% or more forming a stable emulsion. Much of the necessary dehydration must be accomplished at the point of production in order to avoid transportation difficulties. It is generally the practice to provide in a pipe line some sort of filtering devices, usually in the form of fine screens, which will effect the removal of at least some of the solid materials present in the fluid being transported.

It is an object of our invention to provide a pipe line strainer which will remove a maximum amount of water and solid material from a crude oil or viscous material.

It is a further object of our invention to provide a pipe line strainer in which the liquid undergoing filtration effects a cleaning or scouring action of the filtering screens in the strainer.

It is another object of our invention to provide a pipe line strainer in which filtration is effected by a combined screening and absorptive action.

It is a still further object of our invention to provide a pipe line strainer in which the filter elements are readily removable for cleaning or replacement.

Other and further objects of our invention will appear from the following description and the appended claims.

In the accompanying drawing which forms part of the instant specification and is to be read in conjunction therewith and in which like numbers refer to like parts throughout the several views:

Figure I is a vertical section of a pipe line strainer forming the subject matter of our invention.

Figure II is a view in section taken along the line 2—2 in Figure I.

In general, we have provided a straining device formed by a shell having the customary inlet and outlet openings at its opposite sides for connection to pipe line sections and a cleanout port located adjacent the lowest portion of a downwardly sloping bottom of the shell. Supported by and within the shell is a container having solid side walls and screened upper and lower openings. The interior of the container is packed with a suitable material which will provide large surface contact area per unit of volume, such material being, for example, wood fiber or excelsior. The shell embodies a hinged cover member provided with devices which will maintain the container in fluid tight relationship with the interior of the shell. The upper portion of the shell has formed therein a port which will serve for the introduction of a fluid under pressure for cleaning purposes.

Referring now, more particularly, to the drawing, we provide a shell 1 substantially rectangular in cross-section having a downwardly inclined bottom surface 3. Attached to this bottom surface are supporting members or feet 5 serving to mount the shell in relationship to the pipe line sections not shown. At one end of the shell adjacent to the highest portion of the inclined bottom surface there is provided a main fluid inlet opening 7 having a flanged coupling 9.

At the opposite end of the shell and adjacent to its uppermost portion there is provided a main fluid outlet opening 11 having a similar flanged coupling 13. The outlet end of the shell is provided with a cleanout port 15 adjacent the lowest portion of the downwardly inclined surface 3. A cover member 17 and gasket 19 serves to seal this exit port through the medium of the bolts 21. There is provided on the interior of the shell between the inlet and outlet openings a supporting ledge 23 upwardly inclined from the horizontal. Although we have shown this ledge as formed integrally with the shell 1, it is to be understood that it may be separately formed and attached to the shell by any suitable means.

There is supported within the shell in a manner which will be more fully described hereinafter an elongated container 25 of substantially rectangular shape having imperforate side and end walls. The end walls at the bottom thereof are connected along the medial line of the container by means of a narrow keel-like member 27 to which the side walls are connected by means of the arcuate rib shaped members 29 at suitably spaced points, thus forming a grid like arrangement of parts at the bottom of the container. The bottom of this container is covered by a relatively fine wire mesh screen 31 which is fastened to the wall portions of the container by means of a narrow band of metal 33 secured to the container by the screws 35. The container is considerably higher at one end than at the other and is formed at its upper end with a flange 37. A plate 39 provided with a plurality of perforations 41 covering an area defined by the upper open end of the container serves as a means to fasten a wire screen 43 over the top of the container and on the flanges 37. This cover may be fastened to these flanges by any suitable means such as the screws 45 and projects sufficiently far beyond the flange 37 to rest upon and be supported by the ledge 23. A gasket 47 is disposed between the cover 39 and ledge 23 to secure a fluid tight joint. Lifting eyelets 49 may be screwed into the cover and flange to aid in removing the container from the shell. The interior of the container is filled with a material providing a relatively large area per unit of volume to provide an adsorptive surface for solid particles and an absorptive surface for water which may be contained in the medium flowing through the straining device. Such material may be, for example, wood fiber or excelsior.

The wall at the outlet end of the shell 1 is considerably higher than the wall at the inlet end of the shell. The upper end of the shell is formed with a flange 51, the plane of which is at an angle to the horizontal somewhat greater than the angle formed by the plane of the cover 39 with the horizontal. This flange is shown as integrally formed with the shell but which, if desired, may be separately formed and attached to the shell by welding or in any other simple manner. The flanged coupling member 53 is attached to either side wall of the shell and forms therewith an opening into the shell above the cover member 39.

A cover member 55 is hingedly mounted on the shell by means of the hinge members 57 and 59 connected to the cover 55 and shell 1 respectively. The hinge member 59 is provided with a slotted opening 61 of a length sufficient to permit some movement of the hinge pin 63 therein. A gasket 65 is interposed between a cover 55 and shell flange 51. This cover may be securely fastened to the shell by means of a plurality of bolts 67 passing through the cover and shell flange. An eye bolt 69 may be fastened to the cover at any suitable point to serve as a lifting handle.

Attached to the undersurface of the cover is a pair of parallelly disposed container holders 71 which extend substantially throughout the length of the interior of the shell and in the closed position of the cover are so arranged as to engage the upper surface of the cover plate 39 immediately above the ledge 23 and cause cover plate 39, gasket 47 and ledge 23 to be pressed into firm engagement with each other.

Although we have shown the cover plate 39 extending beyond the perimeter of the container flange 37 and resting on the ledge 23, it is to be understood that this is by way of example only and that the flange 37 may alternatively be extended beyond the cover plate 39 or be co-extensive with and rest upon ledge 23.

The operation of our device is as follows:

Crude oil carrying solid material such as sand and small amounts of water enters through the inlet opening 7 and passes through the screen 31 in the bottom of the container 25. This screen serves to remove a substantial amount of the solid material carried by the oil. The oil then flows upwardly through the excelsior or wood fiber in the container 25 and, as a result of "preferential wetting", the water is taken up by the wood fiber by absorption while a certain amount of solid material which may have passed through the screen 31 is deposited upon surfaces of the fibers as a result of adsorption. The final cleaning of the oil will be effected by the upper screen 43 through which the oil flows into the upper portion of the shell 1 and from which it leaves by discharge opening 11. It will be noted that the oil is caused to flow somewhat in the plane of the screen 31 and screen 43 to thereby aid in removing solid particles which are deposited upon the surfaces of these screens.

After a certain period of use, the intake and discharge valves of the straining device may be closed and the cover plate of the cleanout port 15 removed. Fluid under pressure is then injected through the member 53 into the upper portion of the shell from which it flows downwardly through a screen 43, adsorptive material in the container 25, and screen 31 to the cleanout port 15. After this reverse flow has taken place the strainer may be again put in operation for an extended period of time without the necessity of removing the container 25 from the shell for cleaning. During normal operation of the straining device solid material separated by the screen 31 and water droplets separated by the material within the container 25 settles by gravity to the bottom surface 3 of the shell and accumulate at its lowest portion.

It will be noted that by virtue of the sealing arrangement between the cover 39, supporting ledge 23, and the solid wall container 25, all the oil entering the straining device is caused to pass through the filtering device proper.

The container may be readily removed for cleaning by removing the bolts 67 and swinging the cover 55 back on its hinges. The container may then be quickly and readily removed by lifting it out by means of the eye bolts 49.

It will be observed that we have accomplished the objects of our invention and have provided a pipe line strainer capable of removing a maximum amount of water and solid material from a crude oil but whose filter elements are partially self-cleaning and are readily removable for major cleaning or replacement.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a pipe line straining device having a shell provided with a main fluid inlet and a main fluid outlet, in combination, an imperforate wall container, a screen covering the bottom portion of the container, an absorption medium in said container, a second screen covering the top of the container and at an angle to the axis of said inlet, a perforate cover fastening said second screen to said container and supporting said container in the shell, a cover for said shell, and means associated with said shell cover and said screen cover for maintaing said container in fixed position in said shell.

2. A pipe line strainer comprising in combination a shell having a cleanout port formed in and adjacent to its bottom portion, main fluid inlet and outlet ports formed in said shell, supporting means within the shell, a perforate partition angularly inclined to the horizontal, separating the shell into an inlet chamber and an outlet chamber, a container in the inlet chamber, said container having screened upper and lower portions and being connected to the perforate partition, a cover for said shell, compressing means attached to said cover and so arranged as to cause said cover to sealingly engage said supporting means, absorption means in said container and a fluid inlet port in said outlet chamber.

DANIEL J. MORAN.
EDWIN O. BENNETT.